United States Patent

Mathur et al.

Patent Number: 5,864,555
Date of Patent: Jan. 26, 1999

[54] METHOD AND APPARATUS FOR GENERATING A PROXY CONNECTION ENDPOINT FOR OPERATION ADMINISTRATION AND MANAGEMENT (OAM) ASYNCHRONOUS TRANSFER MODE (ATM) CELLS

[75] Inventors: Deepak Mathur, Waterbury, Conn.; David X. Chen, Plano, Tex.; L. David Danenberg, Woodbury, Conn.

[73] Assignee: General DataComm, Inc., Middlebury, Conn.

[21] Appl. No.: 675,955

[22] Filed: Jul. 5, 1996

[51] Int. Cl.⁶ .................................................. H04J 3/14
[52] U.S. Cl. ........................ 370/395; 370/419; 370/463
[58] Field of Search .................................. 370/246, 248, 370/249, 250, 252, 389, 392, 395, 396, 400, 409, 410, 419, 420, 463, 465, 470, 471

[56] References Cited

U.S. PATENT DOCUMENTS

| | | | |
|---|---|---|---|
| 5,524,000 | 6/1996 | Yoshimura et al. | 370/419 |
| 5,541,913 | 7/1996 | Witters et al. | 370/395 |
| 5,581,549 | 12/1996 | Mochinaga | 370/395 |
| 5,659,540 | 8/1997 | Chen et al. | 370/249 |

*Primary Examiner*—Benedict V. Safourek
*Assistant Examiner*—Seema S. Rao
*Attorney, Agent, or Firm*—David P. Gordon; Thomas A. Gallagher

[57] ABSTRACT

Methods and apparatus are provided for handling asynchronous transfer mode (ATM) cells sent from first user equipment through a plurality of ATM nodes and destined for second equipment, when the second equipment does not support ATM operations and maintenance (OAM) functionality. In particular, an ATM node connected to the second equipment is configured as an OAM proxy connection end-point for the second equipment such that ATM data cells which are destined for the second equipment are sent in a usual fashion, but ATM OAM cells destined for the second equipment are terminated and acted upon by the ATM node and are not forwarded to the second equipment. The proxy connection end-point functionality is preferably obtained by providing a user-friendly management information database (MIB) which stores configuration information for the ATM node. The configuration information is used by a management processor of the node for deciding when an incoming OAM cell intended for the second equipment is to be terminated by the ATM node.

13 Claims, 9 Drawing Sheets

ATM SWITCH SLOT 0 LINK 0 OAM CONFIG/STATUS

DETAIL OF OAM CONFIG/STATUS TABLE ENTRY 0

|   | LINK No | :0 |
|---|---|---|
| 0 | SEGMENT END POINT | :YES |
| 1 | CONNECTION END POINT | :NO |
| 2 | AIS/RDI GENERATION | :NO |
|   | Rx OAM TYPE | :NONE |
|   | Rx OAM Vpi | :0 |
|   | Rx OAM Vci | :0 |
|   | Rx OAM COUNTER | :0 |
|   | Tx OAM TYPE | :NONE |
|   | Tx OAM Vpi | :0 |
|   | Tx OAM Vci | :0 |
|   | Tx OAM COUNTER | :0 |
| 3 | RESET STATS | :NO |

SELECT OPTION :
DOWN, ENTER ENTRY NUMBER TO EDIT, GOTO ROW,
PRESS ^] FOR EXTRA HELP ON THIS ITEM, SUMMARY, EXIT

FIG.5c

METHOD AND APPARATUS FOR GENERATING A PROXY CONNECTION ENDPOINT FOR OPERATION ADMINISTRATION AND MANAGEMENT (OAM) ASYNCHRONOUS TRANSFER MODE (ATM) CELLS

The present invention is related to co-owned, U.S. Ser. No. 08/573,244, now U.S. Pat. No. 5,659,540, which is hereby incorporated by reference herein in its entirety.

BACKGROUND OF THE INVENTION

1. Field of the Invention

The present invention broadly relates to telecommunications. More particularly, the present invention relates to the termination of OAM cells in an ATM network.

2. State of the Art

Perhaps the most awaited, and now fastest growing technology in the telecommunication field in the 1990's is known as Asynchronous Transfer Mode (ATM) technology. ATM is providing a mechanism for removing performance limitations of local area networks (LANs) and wide area networks (WANs) and providing data transfers at a speed of on the order of terabits/second. The variable length packets of LAN and WAN data are being replaced with ATM cells which are relatively short, fixed length packets. Because ATM cells can carry voice, video and data across a single backbone network, the ATM technology provides a unitary mechanism for high speed end-to-end telecommunications traffic.

In order for ATM technology to develop, it must be functional in its own right as well as compatible with existing technology. To be compatible, on the one hand, the ATM cells must be capable of receiving and accommodating voice, video, and LAN and WAN type data; while on the other hand, ATM cells must be capable of adapting to high speed technology such as the synchronous optical network (SONET). In order to meet these and other requirements, a technical group called the ATM Forum which is comprised of numerous corporate representatives has been proposing ATM "standards" which are being provided to ANSI and the ITU-T for their consideration and adoption. Details of those standards may be found in proceedings of the ATM Forum. Of particular interest among the ATM Forum, ANSI and ITU-T documents is a document which is incorporated by reference in its entirety herein and which is dated November 1995 and entitled "B-ISDN Operation and Maintenance Principles and Functions, ITU-T Recommendation I.610".

As is set forth in Section 2 of Draft Recommendation I.610, Operation, Administration, and Management (OAM—also called Operation and Management) cells provide performance monitoring, defect and failure detection, system protection, defect information, and fault localization functions. Performance monitoring is a function which processes user information to produce maintenance information specific to the user information. The maintenance information is added to the user information at the source of a connection/link and extracted at the sink of a connection/link. Analysis of the maintenance event information at the connection sink allows analysis of the transport integrity. Defect and failure detection is accomplished by continuous or periodic checking and results in the production of various alarms. In the system protection function, the effect of a defect on the transport of user information is minimized by blocking or changeover to other entities, and the failed entity is excluded from operation in order to protect the system. Response to status report requests will also be given. Fault localization involves a determination by internal or external test systems of a failed entity if defect information is insufficient.

As set forth in Section 7.1 of the ITU-T Recommendation, and as seen in prior art FIG. 1, the ATM layer OAM cell includes five bytes of header followed by a forty-eight byte OAM Cell Information Field. Details of the five bytes of header include are set forth in Recommendation I.361 which is hereby incorporated by reference herein in its entirety. Recommendation I.361 states that for F4 virtual path connection flow identification (belonging to the ATM Layer Management), two pre-assigned VCIs are used to distinguish OAM cells meant for VPC (Virtual Path Connection) end-to-end or VPC segments. These two values are defined in Recommendation I.361. For F5 virtual channel connection flow identification (also belonging to the ATM Layer Management), two PTI values are used to distinguish OAM cells for VCC (Virtual Circuit Connection) end-to-end or VCC segments. These two values are defined in Recommendation I.361. Since OAM functionality is on a per VP or VC basis, the five byte headers of the OAM cells contain the VPI (for F4) or VPI/VCI (for F5) of the connection with which the OAM cell is associated.

Turning to the forty-eight byte OAM Cell Information Field seen in FIG. 1, the first four bits define the OAM cell type; e.g., fault management, performance management, and activation/deactivation. The next four bits identify the OAM function type; i.e., the type of function performed by the cell within the management type. For fault management, the function types include an alarm indication signal (AIS), a remote defect indication (RDI), a loopback, and a continuity check. For performance management, the function types include forward monitoring, and backward reporting. For activation/deactivation, the function types include performance monitoring, and continuity check. Following the four bit OAM function type field, forty-five bytes of information pertinent to the function type are sent, followed by a six bit reserved field for future use, and a ten bit error detection code field.

A desirable mechanism for fault localization, pre-service connectivity verification, and on-demand connectivity monitoring is the use of an OAM loopback cell (which, as set forth above, is a fault management function). The ATM layer loopback capability allows for OAM loopback cells to be injected at one location, along a VPC or VCC, and returned at a different location, without having to take the connection out of service. Thus, a loopback cell can be injected at any accessible point along the VPC or VCC (i.e., at either end-point or at any connecting point). This cell is looped back at a downstream segment end-point or connection end-point specified by the information contained in the OAM cell. Details of the loopback capability are described in previously incorporated U.S. Ser. No. 08/573,244, now U.S. Pat. No. 5,659,540.

While the loopback and other OAM capabilities provide great advantages in the management of ATM networks, it will be appreciated that a major limitation of managing an ATM network is the possibility that an end-point does not support OAM functionality. In particular, the connection end-point may be a router, frame relay equipment, a LAN, or other non-OAM-supporting equipment. In such a situation, OAM cells which are received by the non-OAM-supporting end-point will either be discarded, ignored, or improperly interpreted by the receiving equipment. In any event, the desired result of system management will not be attained as the OAM cells will not be properly terminated.

SUMMARY OF THE INVENTION

It is therefore an object of the invention to provide an apparatus and method for terminating OAM cells intended for a non-OAM supporting end-point.

It is another object of the invention to provide ATM equipment coupled to a non-OAM-supporting end-point with a mechanism for acting as a proxy end-point for the non-OAM-supporting end-point.

It is an additional object of the invention to provide ATM equipment coupled to a non-OAM-supporting end-point with a user-friendly management information base (MIB) which is coupled to the ATM equipment and which is used to designate the ATM equipment as the proxy end-point for the non-OAM-supporting end-point.

In accord with the objects of the invention, an ATM node (also called an ATM switch) coupled to a non-OAM supporting end-point is provided with means for establishing the ATM node as a proxy connection end-point in lieu of the non-OAM supporting end-point for ATM OAM functions. In particular, the ATM node is provided with a memory, a management processor, a header processor with an associated routing RAM, and a management information base (MIB) which are all typically located on and as part of a circuit board card which interfaces with a backplane switch fabric. The header processor has the functions of: (i) receiving an incoming ATM formatted data stream, (ii) identifying OAM cells in the ATM formatted data stream, (iii) forwarding the OAM cells to the memory of the node, and (iv) forwarding all other ATM cells not intended for the node for output from the node. The management processor has the functions of: (i) acting on the OAM cells received in the memory, including terminating all OAM cells intended for the node or for the non-OAM-supporting equipment, (ii) generating outgoing OAM cells, and (iii) writing information to the routing RAM associated with the header processor. The MIB is designed to store configuration information for the ATM node and to interface with the management processor and user equipment. Thus, where the ATM node is configured as a proxy connection end-point for a non-OAM-supporting connection end-point, the MIB provides the management processor with that information such that any OAM data intended for the non-OAM-supporting connection end-point is terminated in the ATM node.

According to a preferred aspect of the invention, the MIB is accessed by a user-friendly graphical interface so that a user can access screens which permit the ATM node to be easily configured (programmed) as an OAM cell proxy connection end-point. According to another preferred aspect of the invention, via the MIB, each link on the ATM node is configurable for OAM cell as a segment end-point or a proxy connection end-point. Where the link is configured as a proxy connection end-point, it will terminate AIS cells, generate upstream RDI cells, and turn around end-to-end loopback cells for all VPCs and VCCs on the link. On the other hand, all data cells will be forwarded to the true connection end-point.

The objects and advantages of the invention will become apparent to those skilled in the art upon reference to the detailed description taken in conjunction with the provided figures.

BRIEF DESCRIPTION OF THE DRAWINGS

FIG. 4 is a functional block diagram of the OAM management processor of FIG. 3a.

FIGS. 5a–5c are MIB screens used in configuring the ATM node as a proxy connection end-point.

DETAILED DESCRIPTION OF THE PREFERRED EMBODIMENT

Figure 2A:
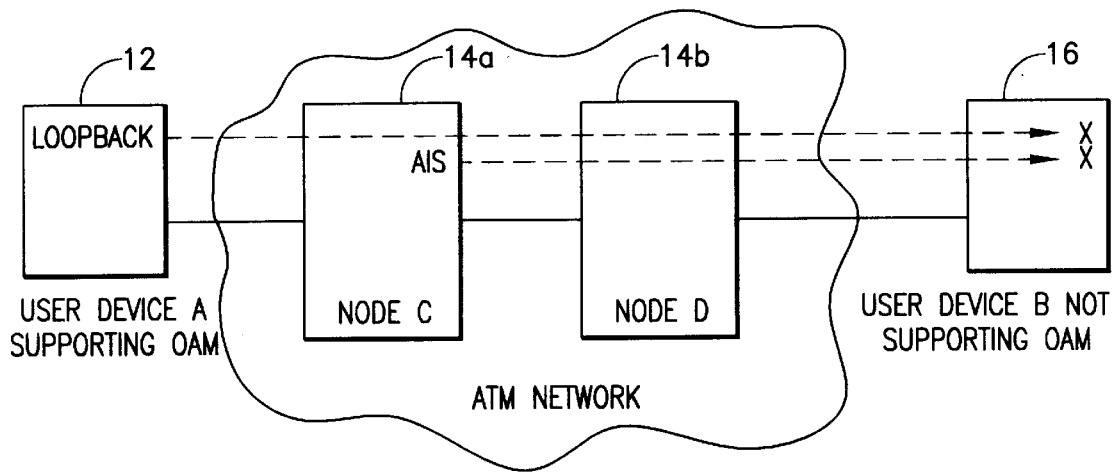
FIGS. 2a and 2b are diagrams showing respectively a network without a proxy end-point feature and a network with a proxy end-point feature.

A high level diagram of a network without the connection proxy end-point feature of the invention is seen in FIG. 2a. In the network of FIG. 2a, an OAM loopback cell is shown being transmitted from a user device 12 which supports OAM, through several nodes or switches 14a, 14b, to the intended receiving user apparatus 16. Because the receiving user apparatus 16 does not support OAM, the OAM cells are ignored by the receiving user apparatus 16. Thus, the loopback fails as indicated by the "X". Similarly, where a node such as node 14a generates an OAM alarm indication signal (AIS) cell, the AIS cell will be passed by node 14b to the user apparatus 16. Again, because the user apparatus 16 does not support OAM, upon receiving the OAM AIS cell, the user apparatus 16 will fail (as indicated by the "X") to return a remote defect indication (RDI) cell as required.

Figure 2B:
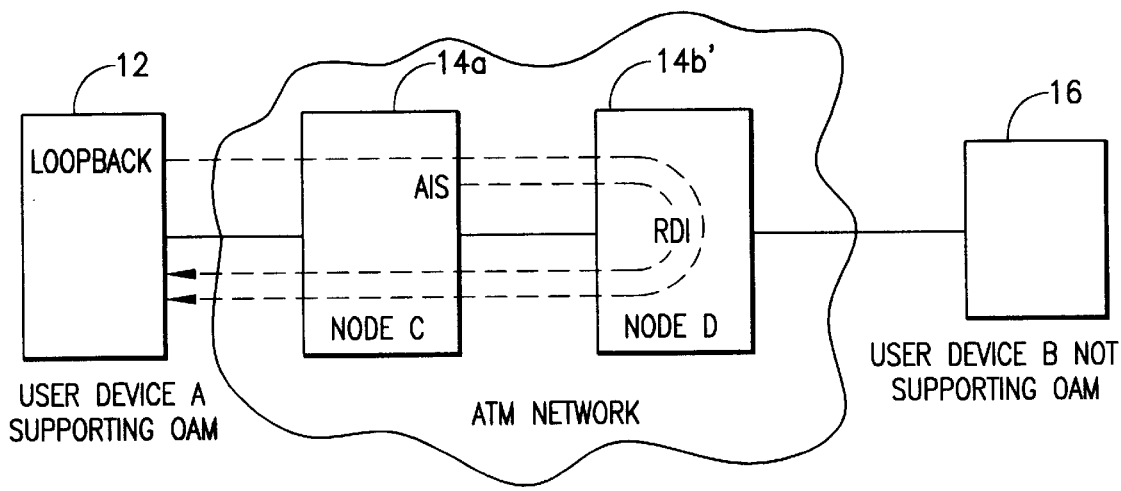

As will be described in detail below, with the proxy connection end-point feature of the present invention as indicated in FIG. 2b, when a loopback cell is generated by the user device 12 for the non-OAM-supporting user apparatus 16, the loopback cell is forwarded from node 14a to node 14b'. Since node 14b' is configured to act as a proxy end-point for user apparatus 16 which does not support OAM functionality, node 14b' loops back the cell appropriately (i.e., changes the loopback indication value as discussed in previously incorporated U.S. Ser. No. 08/573,244, now U.S. Pat. No. 5,659,540). Similarly, where node 14a generates an AIS cell intended for user apparatus 16, the proxy end-point connection node 14b' will generate an RDI cell for return to node 14a.

Figure 3A:
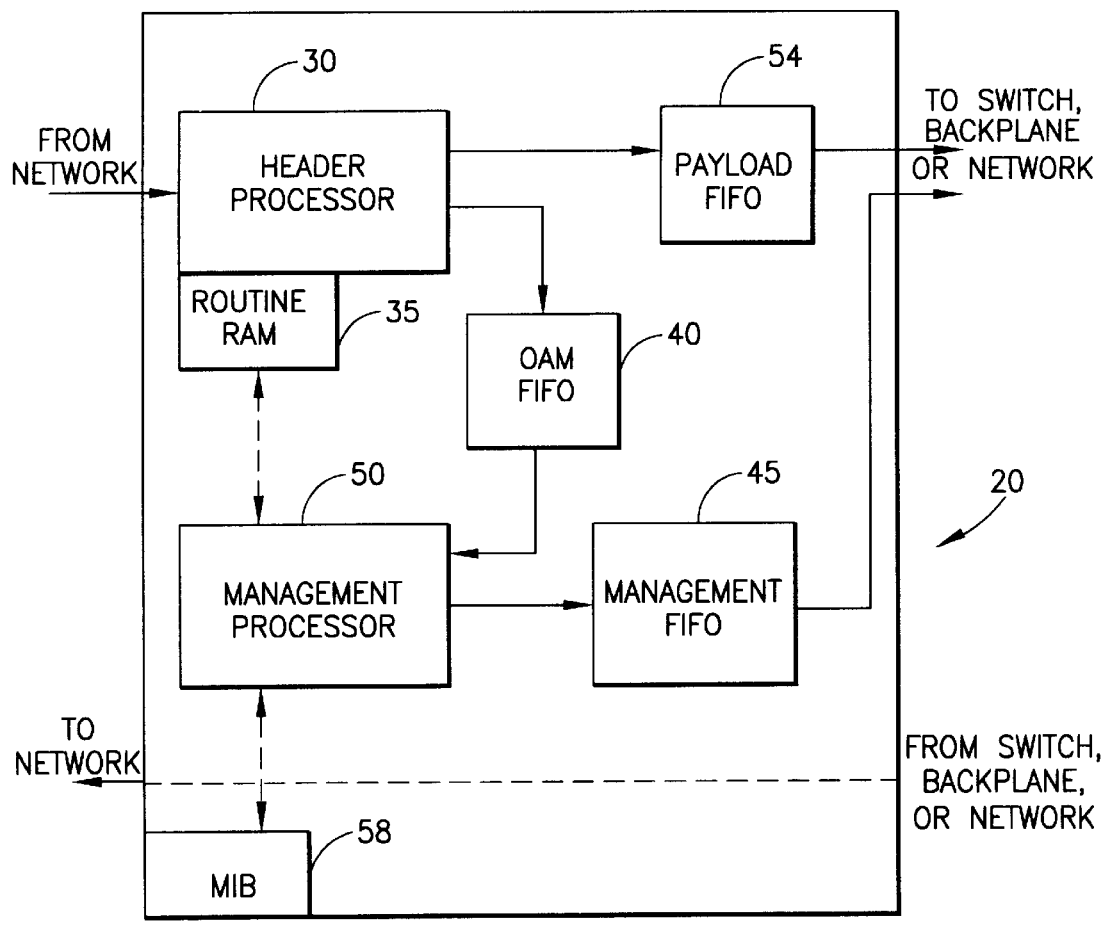
FIG. 3a is a high-level block diagram of the apparatus of the invention which constitutes a portion of a larger ATM processing card.

The apparatus 20 of the invention which acts as a proxy connection end-point is seen in high level block diagram form in FIG. 3a. The apparatus 20, which is typically contained on a circuit board (not shown), is equipment preferably substantially as is available from General DataComm, Inc. of Middlebury, Conn. as an APEX slot controller card. The apparatus can be viewed as a circuit including a header processor 30 with a routing RAM 35, an OAM FIFO 40, a management FIFO 45, a management processor 50, a payload FIFO 54, and a MIB (management information base) 58. Effectively, ATM data from the network is received at the header processor 30 for a particular link via appropriate interface circuitry (not shown) such as a line interface module as set forth in co-owned U.S. Pat. No. 5,436,893 to Barnett. The header processor 30 looks at the five byte header of each incoming cell to determine whether the cell is an OAM cell, or a regular data cell. If the cell is a regular data cell, the header processor processes the header (e.g., inserts a new VPI/VCI) based upon information stored in the routing RAM 35, and forwards the cell to the payload FIFO 54. Cells forwarded to the payload FIFO 54 are typically then forwarded to a terminating device, or to a switch, backplane, or network as indicated and discussed in more detail below with respect to FIG. 3*b*. On the other hand, if the cell is an OAM cell, the header processor 30 forwards the cell to the OAM FIFO 40. The OAM cells are then analyzed and/or processed by the management processor in a manner discussed in more detail below with respect to FIGS. 4 and 6. Thus, if the OAM cells are for the slot card 20 or the non-OAM-supporting equipment for which the node is acting as a proxy connection end-point, the OAM cells are terminated by the management processor 50. For example, where the apparatus of FIG. 3*a* is at the receiving end-point of an OAM loopback, or is acting as a receiving connection end-point proxy for the non-OAM-supporting apparatus, the management processor 50 modifies the loopback indication value in the cell, and inserts the "backward" cell via the management FIFO 45 via the switch of FIG. 3*b* into an ATM cell stream. On the other hand, if the OAM cells are intended for other equipment, they are not terminated, but are forwarded to the management FIFO 45 for output to the backplane or network.

Figure 3B:
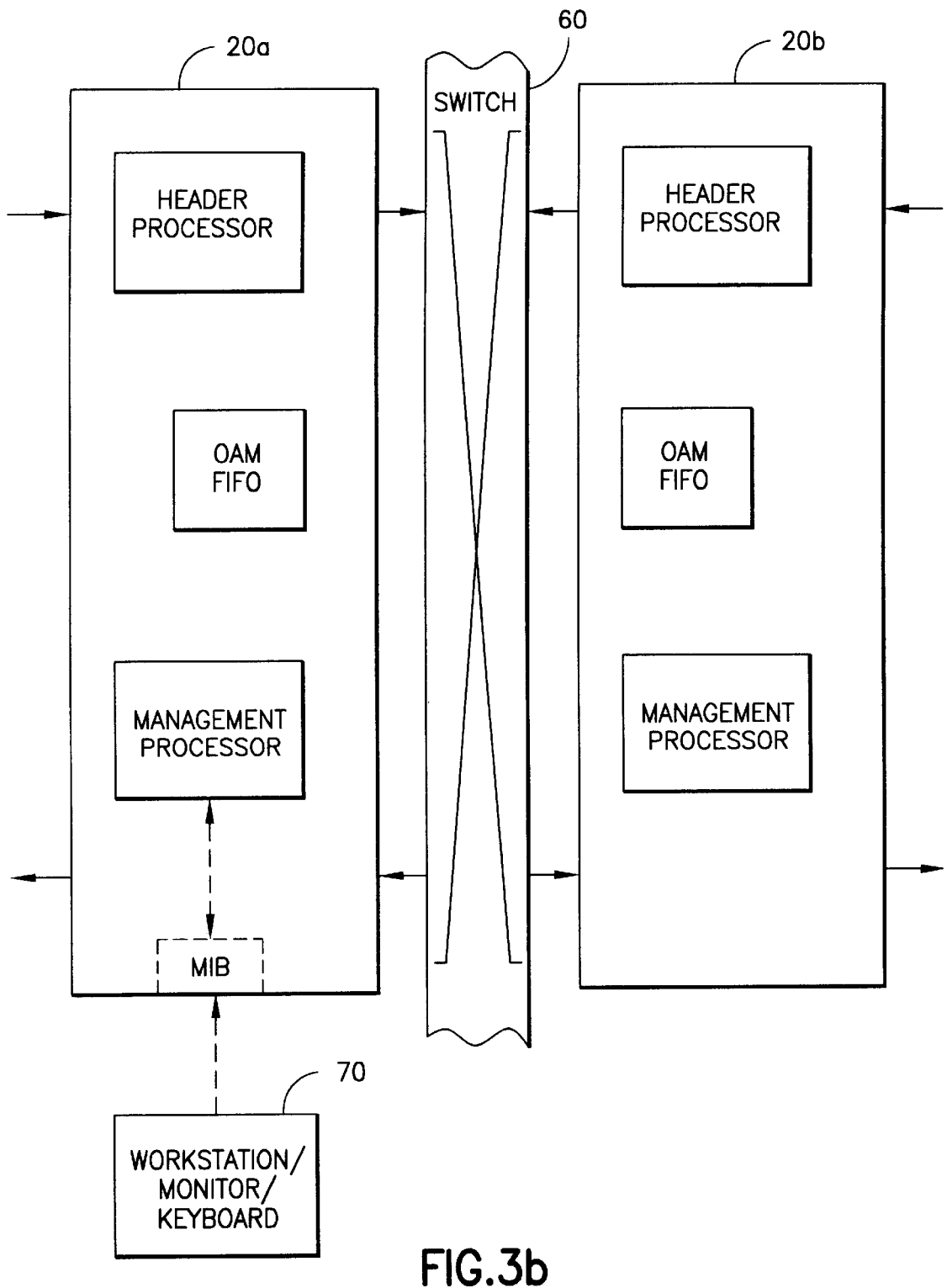
FIG. 3b is a block diagram of a system utilizing the apparatus of the invention in conjunction with a terminal and a switch fabric.

Before turning to details of the OAM management processor, it should be appreciated that the preferred embodiment of the apparatus of the invention is typically arranged as part of a larger system as seen in FIG. 3*b*. Thus, as seen in FIG. 3*b,* identical units 20*a* and 20*b* are seen with a cross-connect switch 60 therebetween. The management processor 50 is coupled either to a workstation/monitor/keyboard system 70 such as sold under the trademark SPARC by Sun MicroSystems, Inc., of Mountainview, Calif., via a serial line interface (not shown) and via the MIB 118, which permits the management processor to be programmed as desired, or through a remote management system (via the MIB) sold under the trademark NMS-3000 by General DataComm, Inc., of Waterbury Conn.

Figure 4:
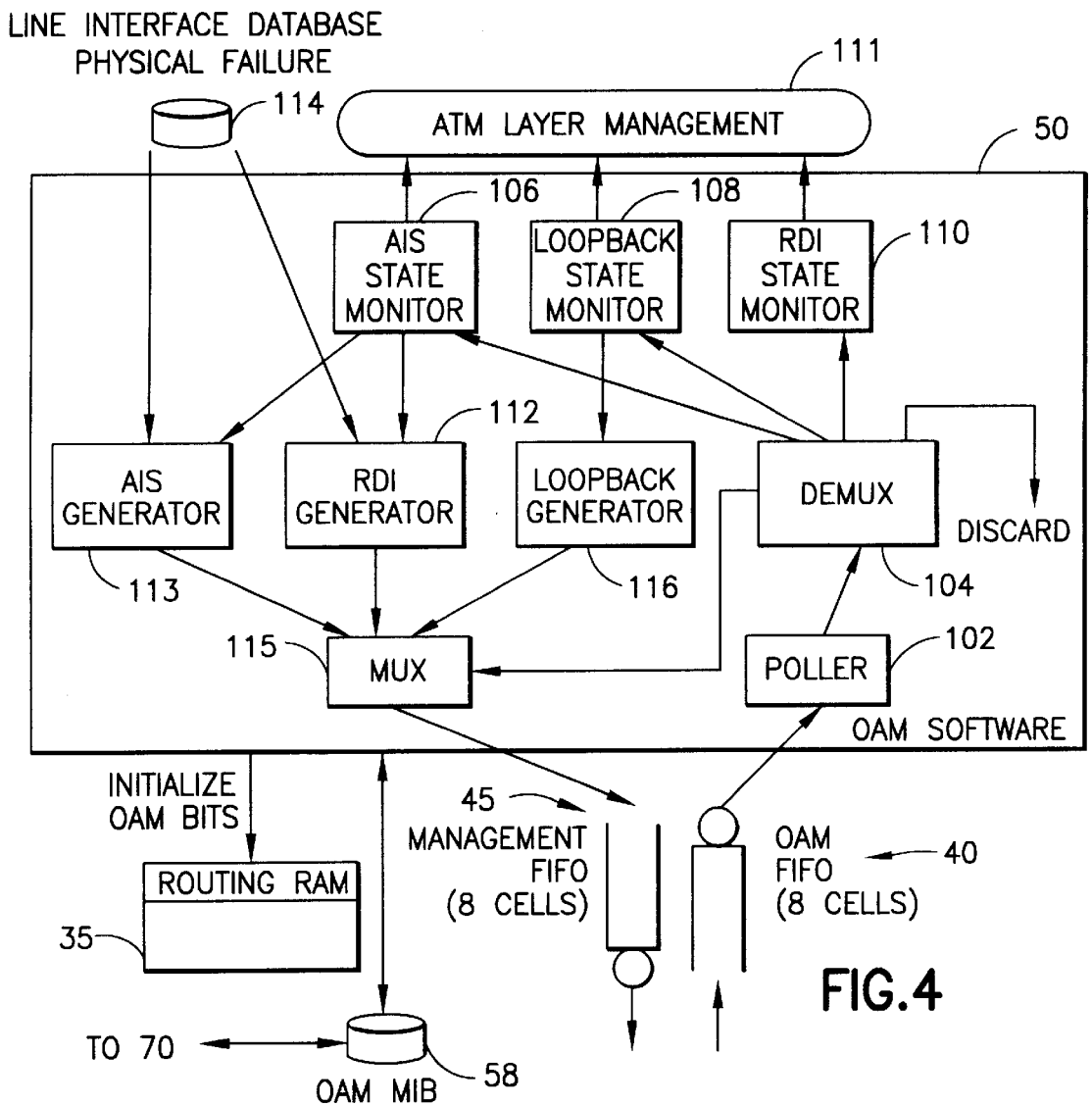

Turning now to FIG. 4, a functional block diagram of the OAM management processor 50 (which is preferably implemented as a Motorola 68302 microprocessor) of FIG. 3*a* is seen. Thus, the poller 102 of the management processor 50 periodically polls the OAM FIFO 40 to see whether OAM cells are present. Depending on the OAM function type (as determined by the Function Type field in the OAM payload), the OAM cells are demultiplexed by demultiplexer 104 and processed by the AIS state monitor 106, the loopback state monitor 108, or the RDI state monitor 110 which all report to ATM layer management 111. The AIS state monitor 106 is usually at a normal state. If an AIS cell is received, the state is changed to the AIS state which causes the AIS generator 113 to generates one AIS cell in the forward direction or triggers the RDI generator 112 to generate one RDI OAM cell in the reverse direction for potential channel conditioning.

The loopback state monitor 108 monitors the connectivity of the virtual path or virtual channel connection, segment or end-to-end. As discussed in previously incorporated U.S. Ser. No. 08/573,244, now U.S. Pat. No. 5,659,540, the connection is usually in the normal state. If a loopback test is activated, the state will switch to the loopback test state where the loopback cell generator 116 generates and transmits a forward loopback OAM cell with a correlation tag and waits for the cell to return. If the cell returns within the timeout set for it, the loopback succeeds and the loopback monitor 108 returns to the normal state. However, if the cell does not return within the timeout, the loopback monitor enters the failure state.

Figure 5A:
Figure 5B:

Turning now to FIGS. 3*a,* 4, and 5*a*–5*c* and according to the preferred embodiment of the invention, the OAM MIB 118 is a portion of a memory means (typically about 25K being allotted for the MIB) which stores programmatic and configuration information for the switch node 20. Among the information stored is information which can be used to program the node 20 as a proxy end-point connection apparatus on a per-link basis. In particular, the OAM MIB 118 which is sold as part of the APEX slot controller card of General DataComm, Inc. is effectively a program which provides the user (utilizing the workstation or the NMS-3000 system) with multiple screens from which the user can configure the routing RAM 35 and hence the apparatus 20. As seen in FIG. 5*a,* one high-level screen permits the user to choose between making changes to an OAM Configuration Table, and a Loopback Configuration/Status. If the OAM Configuration Table is selected, the screen of FIG. 5*b* is generated which permits the user to select the desired link to be configured. Upon selecting the desired link, the screen of FIG. 5*c* is generated. As seen in FIG. 5*c,* default values for the OAM configuration of the apparatus are provided. However, the user can change the default values as desired. Thus, in the case of a link being coupled to a non-OAM-supporting connection end point, if it is desired to provide a proxy connection end point, the user would select option "3" to reset the status, and then would change the connection end point from "no" to "yes". By configuring the link as a connection end-point, the node will act as a proxy for the end-point to which the OAM cell was destined. However, all data cells received on that link will continue to be forwarded to that non-OAM-supporting end-point.

Figure 6A:
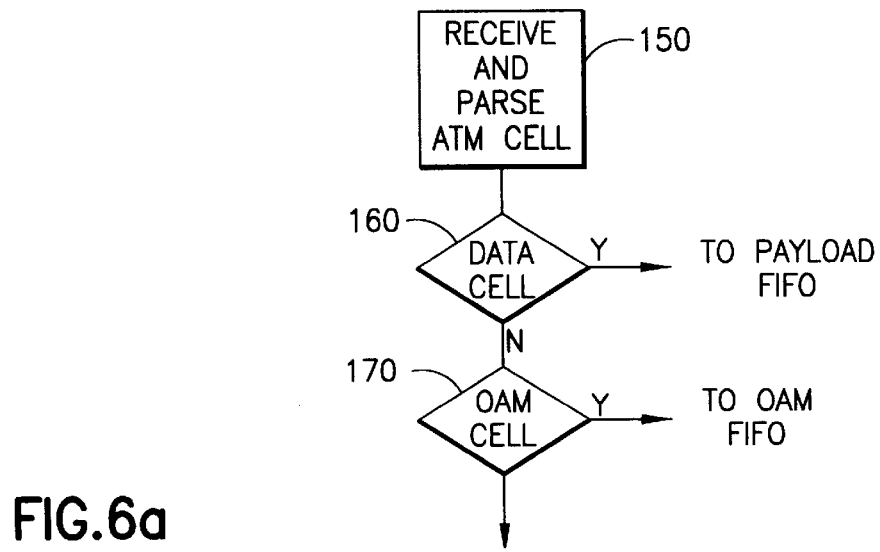
FIGS. 6a and 6b (represented as FIGS. 6b-1, 6b-2 and 6b-3 on three separate sheets) are flow charts of the programming of the header processor and management processor of FIG. 4 with respect to OAM cells, with the flow chart of FIG. 6b being specific with respect to loopback OAM cells.

Once the information regarding the OAM support for the link of the switch is entered and forwarded to the MIB 118, the management processor 70 takes the information so that it can determine whether to terminate an incoming OAM cell, or pass it through to the network. Thus, when an ATM cell is received by the node on a link, as seen in FIG. 6*a* at 150, the header processor parses the cell to determine whether the incoming cell is an OAM cell or a data cell. If the cell is a data cell, it translates the VPI/VCI based on information in the routing RAM, and sends the data at 160 to the payload FIFO. If the incoming cell is an OAM cell, at 170, the header processor forwards the OAM cell to the OAM FIFO.

Figure 1:
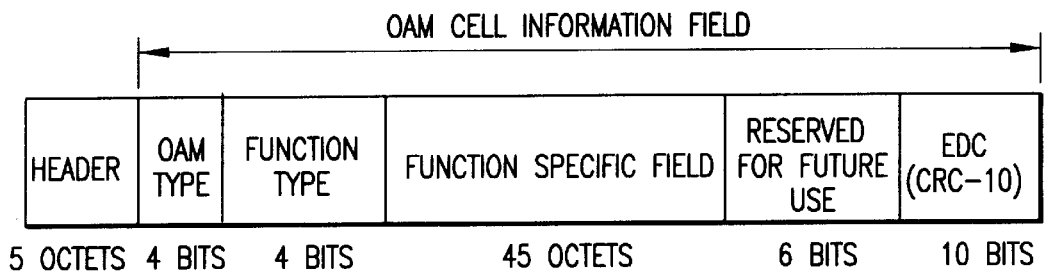
FIG. 1 is a prior art map of an ATM layer OAM cell.
Figure 6B:
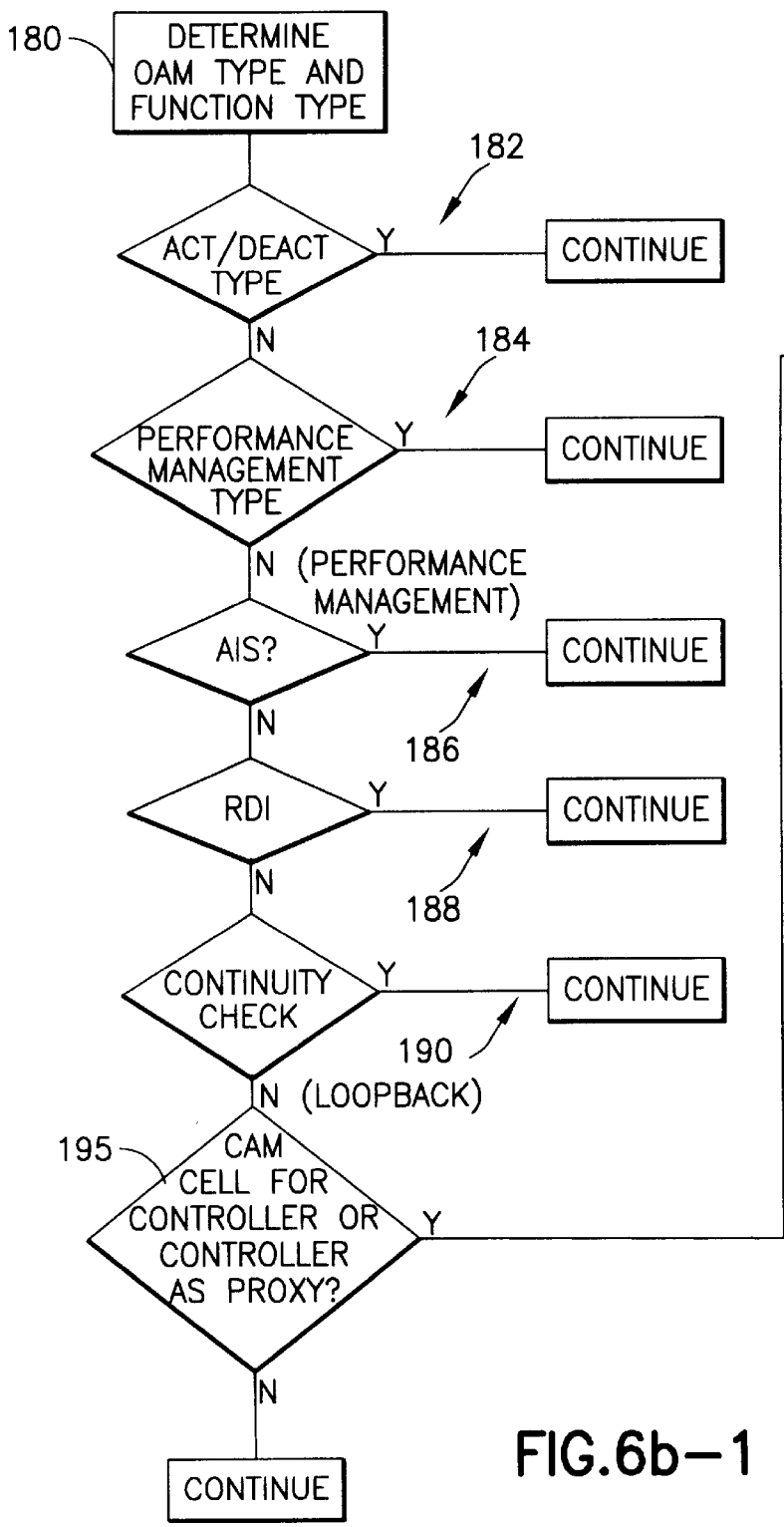
Figures 2, 6B:
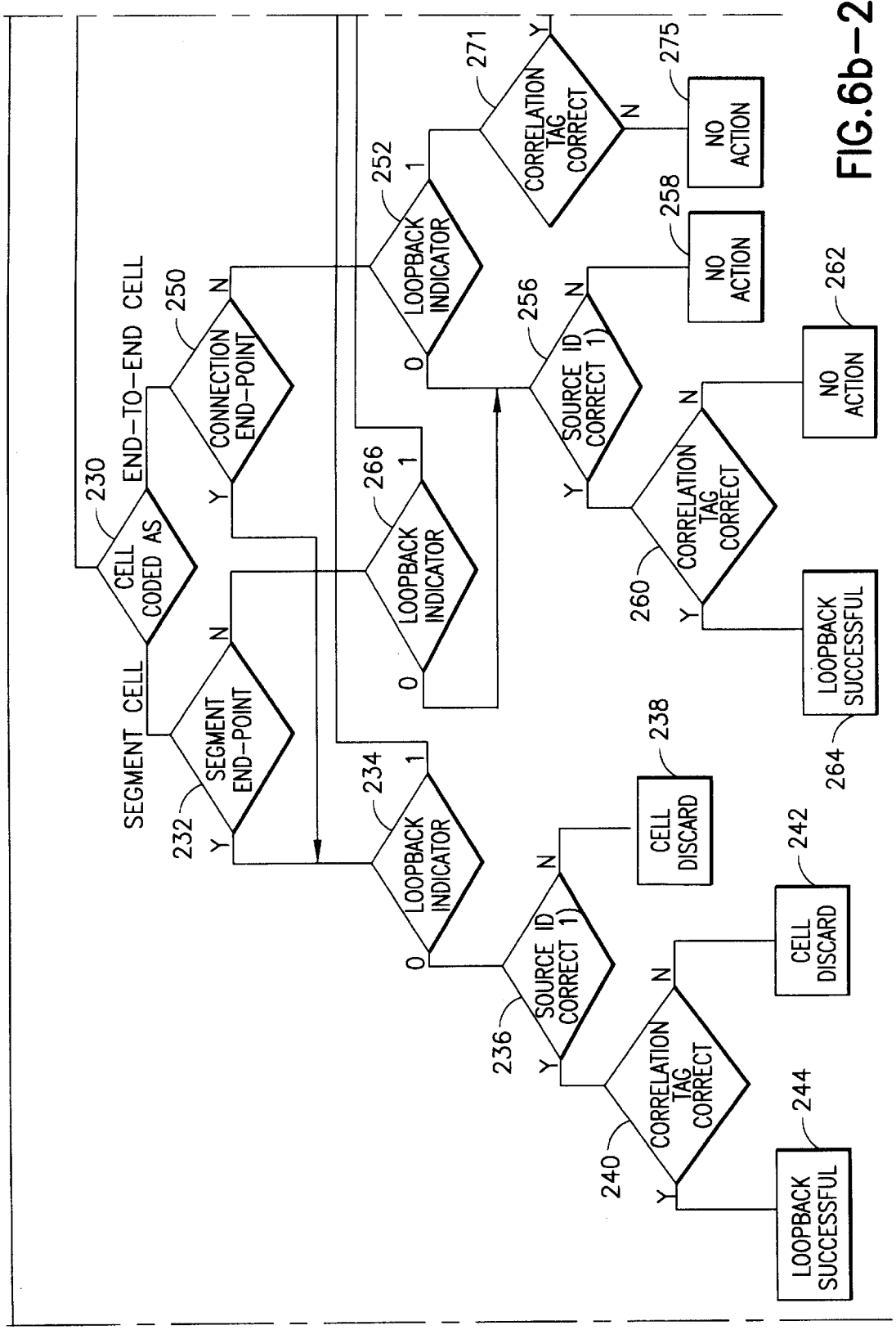
Figures 3, 6B:
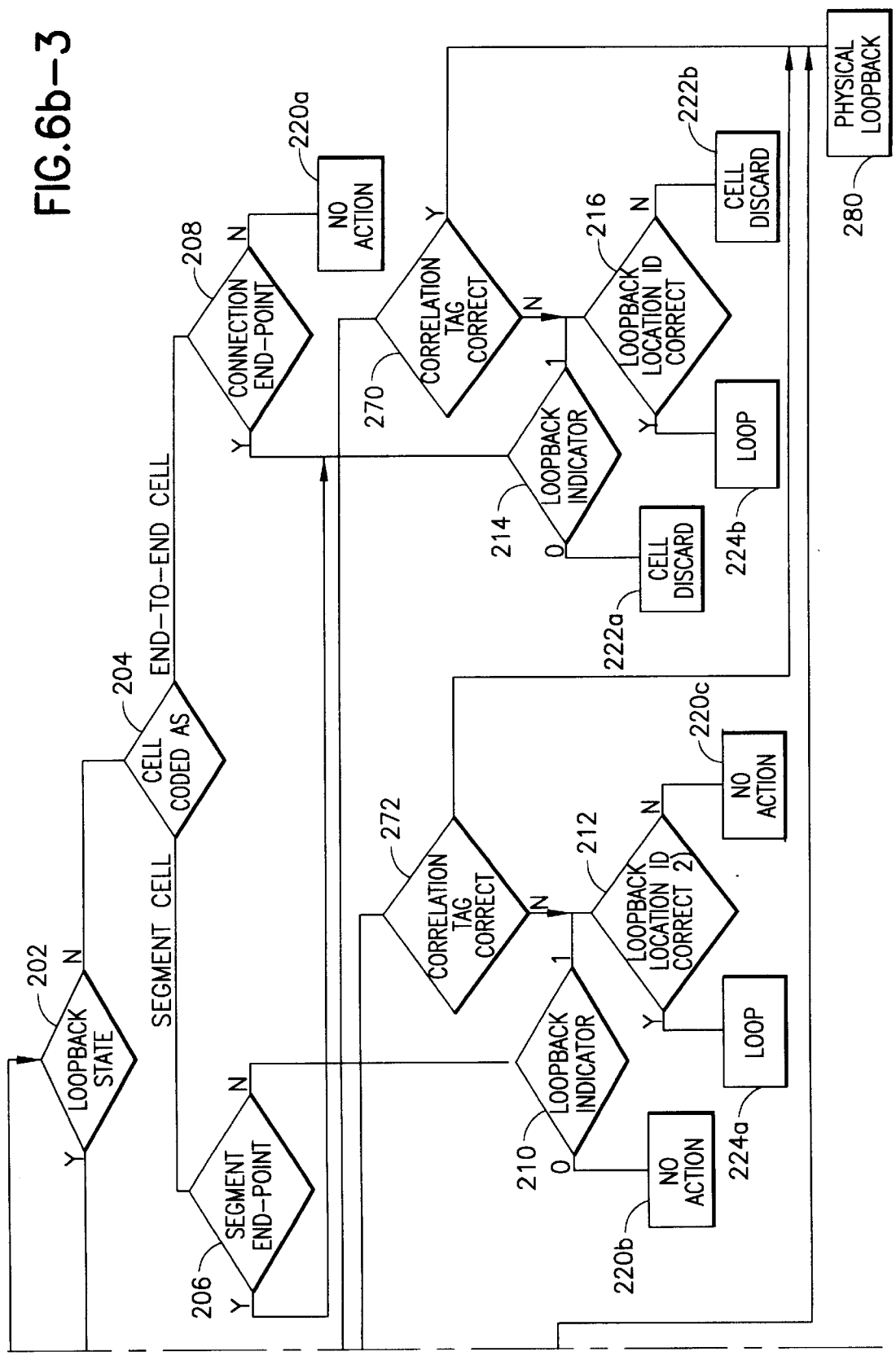

When an OAM cell is forwarded to the OAM FIFO, the management processor processes the OAM cell. As seen in FIG. 6*b* which is specific with respect only to OAM loopback cells as an example, at 180 the management processor checks the OAM type and function type (see FIG. 1) of the OAM cell. If the OAM cell is an activation/deactivation type cell, at 182 various actions are taken based on the OAM function type. Likewise, if the OAM cell is of the performance management type, at 184 various actions are taken based on the OAM function type. If the OAM cell is of the fault management type, if the function type is AIS, at 186 certain actions are taken (as discussed above with reference to FIG. 4). If the function type is RDI, at 188, other actions are taken. If the function type is a continuity check, at 190, yet other actions are taken. If the function type is a loopback, at 195, a determination is made as to whether the OAM loopback cell is intended for the slot controller 20 or for any non-OAM-supporting apparatus for which the slot controller 20 is acting as a proxy connection end-point (based on information in the MIB). If the OAM loopback cell is not intended for the slot controller 20 in its own right or as a proxy connection end-point, other actions are taken (e.g., the OAM cell is forwarded to the management FIFO 45 of FIG.

3a). However, if the OAM loopback cell is intended for the slot controller in its own right or in its function as a proxy connection end-point, then the steps 202–280 are taken as described in detail in previously incorporated co-owned, co-pending U.S. Ser. No. 08/573,244, now U.S. Pat. No. 5,659,540. For purposes of the present disclosure, however, only certain steps of steps 202–280 are particularly relevant. In particular, when a loopback cell is received, and at 202 the node is in not in a loopback state (i.e., the node was not awaiting the return of a loopback it had sent out), at 204 a determination is made as to whether the cell is coded as a segment cell or an end-to-end cell. In the situation of interest, where the node is acting as proxy connection end-point and the cell is coded as an end-to-end cell, at 208 the node will be considered as a connection end-point. Thus, at 214, the loopback indicator of the loopback cell is checked. If a "1" is found in the loopback indicator field, indicating a forward cell, at 216, the loopback location ID is checked, and if correct, at 224b, the cell is looped back by sending the cell to the management FIFO 45 and to the switch backplane of FIG. 3b. If the loopback indicator is a "0" or the loopback location ID is not correct, the cell is discarded at steps 222a and 222b respectively.

With the node of the invention configured as a proxy connection end-point, it will be appreciated that ATM data cells received at an input link of the node will be forwarded to the non-OAM-supporting apparatus, but ATM OAM cells will be advantageously terminated at the node and processed accordingly.

There has been described and illustrated herein an apparatus and method for generating a proxy connection end-point for OAM cells. While particular embodiments of the invention have been described, it is not intended that the invention be limited thereto, as it is intended that the invention be as broad in scope as the art will allow and that the specification be read likewise. Thus, while the invention was described with respect to a particular embodiment where ATM cells are processed on a per-"link" basis and thus the proxy connection end-point is conducted on a per-link basis, it will be appreciated that the proxy connection end-point can be conducted on a per-port or per-channel basis. Thus, instead of the MIB permitting and/or instructing the user to provide information for the link, the user could be permitted and/or instructed to provide information, e.g., on a port by port, or channel by channel basis (i.e., per VPI/VCI). Also, while certain apparatus was disclosed for detecting and processing OAM cells, it will be appreciated that other equivalent apparatus could be utilized. For example, one or more RAMs could be used for storing data instead of FIFOs. Likewise, the functions of the management processor and the header processor could be divided and implemented with discrete circuitry or other components. For example, the header processor could look at the OAM cells to determine whether they are intended for the node or for the non-OAM-supporting equipment, and if not, forward the OAM cells to the switch fabric. In addition, while the MIB was described with reference to certain generated screens, it will be appreciated by those skilled in the art that other user interfaces which permit the programming of the node could be utilized, including interfaces which might use different screens. Also, while particular flow charts for the header processor and the management processor have been provided, it will be appreciated that the processors could be programmed differently. For example, rather than checking as to whether the OAM cell is intended for the slot controller in its own right or as proxy for a non-OAM-supporting equipment after checking for OAM type and function type, that check could be conducted before or during the other checks. It will therefore be appreciated by those skilled in the art that yet other modifications could be made to the provided invention without deviating from its spirit and scope as so claimed.

We claim:

1. An asynchronous transfer mode (ATM) telecommunications apparatus which is coupled to equipment which does not support Operations and Management (OAM) ATM functionality, said ATM telecommunications apparatus comprising:
   a) first memory;
   b) header processor means for receiving an incoming ATM formatted data stream, for forwarding data cells of said incoming ATM formatted data stream from said ATM telecommunications apparatus for said non-OAM-supporting equipment, for identifying incoming OAM cells in the ATM formatted data stream, and for forwarding information related to said OAM cells to said first memory for at least OAM cells intended for said ATM telecommunications apparatus and intended for said non-OAM supporting equipment; and
   c) management processor means coupled to said first memory, said management processor means for terminating OAM cells intended for said ATM telecommunications apparatus and intended for said non-OAM-supporting equipment.

2. A telecommunications apparatus according to claim 1, wherein:
   said first memory comprises a FIFO.

3. A telecommunications apparatus according to claim 1, further comprising:
   a management information database (MIB) means for storing configuration information for said ATM telecommunications apparatus, said configuration information being used by said telecommunications apparatus in deciding whether to terminate said incoming OAM cell.

4. A telecommunications apparatus according to claim 3, wherein:
   said MIB means includes user-interface means for permitting a user to provide said configuration information to said telecommunications apparatus.

5. A telecommunications apparatus according to claim 4, wherein:
   said information related to said OAM cells is forwarded by said header processor means for all OAM cells in said incoming ATM formatted data stream, and said management processor means processes said information related to said OAM cells for all of said OAM cells, and terminates only said OAM cells intended for said ATM telecommunications apparatus and intended for said non-OAM-supporting equipment as dictated by said MIB means.

6. A telecommunications apparatus according to claim 1, wherein:
   said information related to said OAM cells is forwarded by said header processor means to said memory for all OAM cells in said incoming ATM formatted data stream, and said management processor means processes said information related to said OAM cells for all of said OAM cells and terminates only said OAM cells intended for said ATM telecommunications apparatus and intended for said non-OAM-supporting equipment.

7. An asynchronous transfer mode (ATM) telecommunications apparatus which is coupled to equipment which does not support Operations and Management (OAM) ATM functionality, said ATM telecommunications apparatus comprising:

a) header processor means for receiving an incoming ATM formatted data stream, for forwarding data cells of said incoming ATM formatted data stream from said ATM telecommunications apparatus for said non-OAM-supporting equipment, and for identifying in the ATM formatted data stream incoming OAM cells;

b) management processor means coupled to said header processor means, said management processor means for processing information related to said OAM cells, and for processing, as a proxy connection end-point for said non-OAM-supporting equipment, information related to said OAM cells intended for said non-OAM-supporting equipment.

8. A telecommunications apparatus according to claim 7, further comprising:

management information database (MIB) means for storing configuration information for said ATM telecommunications apparatus, said configuration information being used by said manager processor means in acting as a proxy connection end-point for said non-OAM-supporting equipment.

9. A telecommunications apparatus according to claim 8, wherein:

said MIB means includes user-interface means for permitting a user to provide said configuration information to said telecommunications apparatus.

10. A method of handling asynchronous transfer mode (ATM) cells sent from first user equipment through a plurality of ATM nodes and destined for second equipment, wherein said first user equipment supports ATM operations and maintenance (OAM) functionality, and said second equipment does not support ATM OAM functionality, said method comprising:

arranging a particular of said plurality of ATM nodes which is coupled to said second equipment as an OAM proxy connection end-point for said second user equipment such that ATM data cells which are sent from said first user equipment and destined for said second equipment are sent via said plurality of ATM nodes, and forwarded by said particular of said plurality of ATM nodes to said second equipment, and such that ATM OAM cells which are sent from said first user equipment and destined for said second equipment are sent via said plurality of ATM nodes, are processed by said particular of said plurality of ATM nodes, and are not forwarded to said second equipment.

11. A method according to claim 10, wherein:

said arranging includes providing said particular ATM node with a header processor means and a management processor means, said header processor means for receiving said ATM cells, for identifying and forwarding said ATM data cells to said second equipment, and for identifying incoming OAM cells, and said management processor means for processing said incoming OAM cells, and for terminating at said particular ATM node OAM cells intended for said second equipment.

12. A method according to claim 11, wherein:

said arranging further includes providing said particular ATM node with a management information database (MIB) for storing configuration information for said particular ATM node, said configuration information being used by said management processor means for deciding whether an incoming OAM cell intended for said second equipment is to be terminated by said particular ATM node.

13. A method according to claim 12, wherein:

said MIB means includes user-interface means for permitting a user to provide said configuration information to said MIB, and said method further comprises providing said configuration information to said MIB for use by said management processor means.

* * * * *